(12) United States Patent
Asa et al.

(10) Patent No.: US 7,458,314 B2
(45) Date of Patent: Dec. 2, 2008

(54) GAS SPRING

(75) Inventors: Takashi Asa, Tokyo (JP); Hiroshi Murota, Tokyo (JP); Yasushi Saitou, Sakaki-machi (JP)

(73) Assignee: Kayaba Industry Co., Ltd., Tokyo (JP)

( * ) Notice: Subject to any disclaimer, the term of this patent is extended or adjusted under 35 U.S.C. 154(b) by 86 days.

(21) Appl. No.: 11/650,467

(22) Filed: Jan. 8, 2007

(65) Prior Publication Data

US 2007/0187199 A1  Aug. 16, 2007

(30) Foreign Application Priority Data

Feb. 10, 2006  (JP) .............................. 2006-033493

(51) Int. Cl.
*F16F 9/36* (2006.01)
*F16F 9/00* (2006.01)

(52) U.S. Cl. ...................... 92/165 R; 92/168
(58) Field of Classification Search ............... 92/165 R, 92/168

See application file for complete search history.

(56) References Cited

U.S. PATENT DOCUMENTS

| 4,582,303 | A | * | 4/1986 | Taylor ..................... 267/64.13 |
| 4,944,498 | A | * | 7/1990 | Kortgen et al. ............. 92/168 |
| 4,946,143 | A | * | 8/1990 | Bauer et al. ............. 92/165 R |
| 5,011,121 | A | * | 4/1991 | Oriola et al. ............... 92/168 |
| 5,531,299 | A | * | 7/1996 | Bataille ...................... 92/168 |
| 6,820,729 | B2 | * | 11/2004 | Verriet ................. 188/322.17 |

FOREIGN PATENT DOCUMENTS

JP  2002-115739  4/2002
JP  2002286070 A * 10/2002

* cited by examiner

*Primary Examiner*—Thomas E Lazo
(74) *Attorney, Agent, or Firm*—Rabin & Berdo, PC

(57) ABSTRACT

A gas spring (1) comprises a piston rod (4) projecting from an open end of a cylinder (2) so as to be able to elongate and contract axially, and a dust seal (10) which is in contact with the piston rod (4) to prevent dust from invading the cylinder (2). By fitting a seal protecting member (21) to the open end of the cylinder (2) to shield the dust seal (10) from exposure to the outside of the cylinder (2), protection of the dust seal (10) from deterioration and damage is enhanced.

10 Claims, 4 Drawing Sheets

GAS SPRING

FIELD OF THE INVENTION

This invention relates to the protection of a dust seal of a gas spring used for assisting the opening/closing of a swing type vehicle rear window, a vehicle rear window, or a smoke scavenging window of a building.

BACKGROUND OF THE INVENTION

JP2002-115739A, published by Japan Patent Office in 2002 proposes a gas spring comprising a piston enclosed in a cylinder filled with gas, and a piston rod connected to the piston, which projects from the cylinder in an axial direction via a bearing under the pressure of the gas acting on the piston.

A retainer is fixed to the inner circumference of the cylinder between the bearing and the piston so as to limit the displacement of the piston in an elongation direction. The piston rod projects outside the cylinder through the retainer and the bearing. A dust seal is fitted onto the bearing to cause the piston rod to slide on the dust seal, thereby preventing dust from infiltrating the cylinder. The open end of the cylinder is bent inward to retain the dust seal and prevent it from dropping out of the cylinder.

SUMMARY OF THE INVENTION

In the gas spring according to the prior art, the dust seal retained in the opening of the cylinder is exposed to outside of the cylinder in the axial direction, and the dust seal may deteriorate in a short period of time depending on the operation condition of the gas spring. Furthermore, the dust seal exposed to outside is subjected to a physical damage by foreign matter. Deterioration as well as physical damage adversely affects the sealing performance of the dust seal. However, since the dust seal is retained by the bent open end of the cylinder together with the bearing, it is difficult to replace the dust seal.

It is therefore an object of this invention to protect a dust seal from deterioration and physical damage.

In order to achieve the above object, this invention provides a gas spring comprising a cylinder having an open end and filled with a gas, a piston rod projecting outward from the open end of the cylinder in accordance with a pressure of the gas, which performs elongation/contraction depending on an axial load exerted thereon, a dust seal disposed in the cylinder in contact with the piston rod to prevent dust from entering the cylinder through the open end thereof, and a seal protecting member which shields the dust seal from exposure to the exterior of the cylinder.

The details as well as other features and advantages of this invention are set forth in the remainder of the specification and are shown in the accompanying drawings.

DESCRIPTION OF THE PREFERRED EMBODIMENTS

Figure 1:
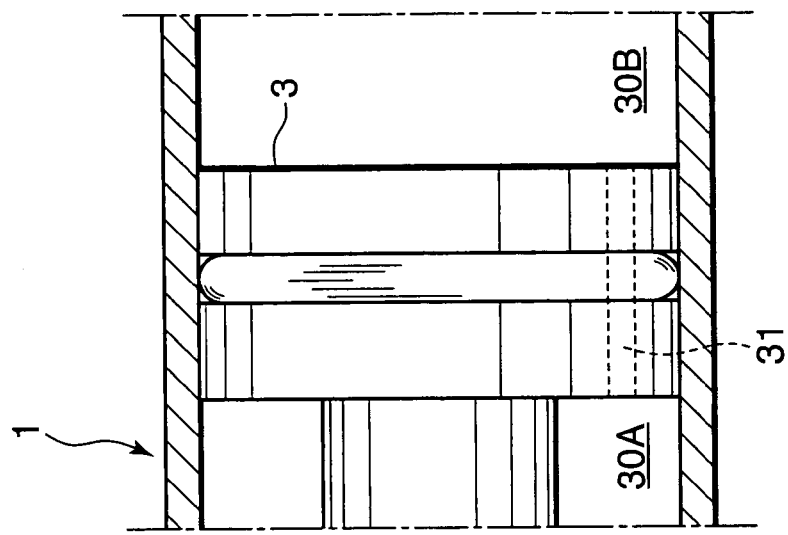
FIG. 1 is a longitudinal sectional view of essential parts of a gas spring according to this invention.
Figure 1:
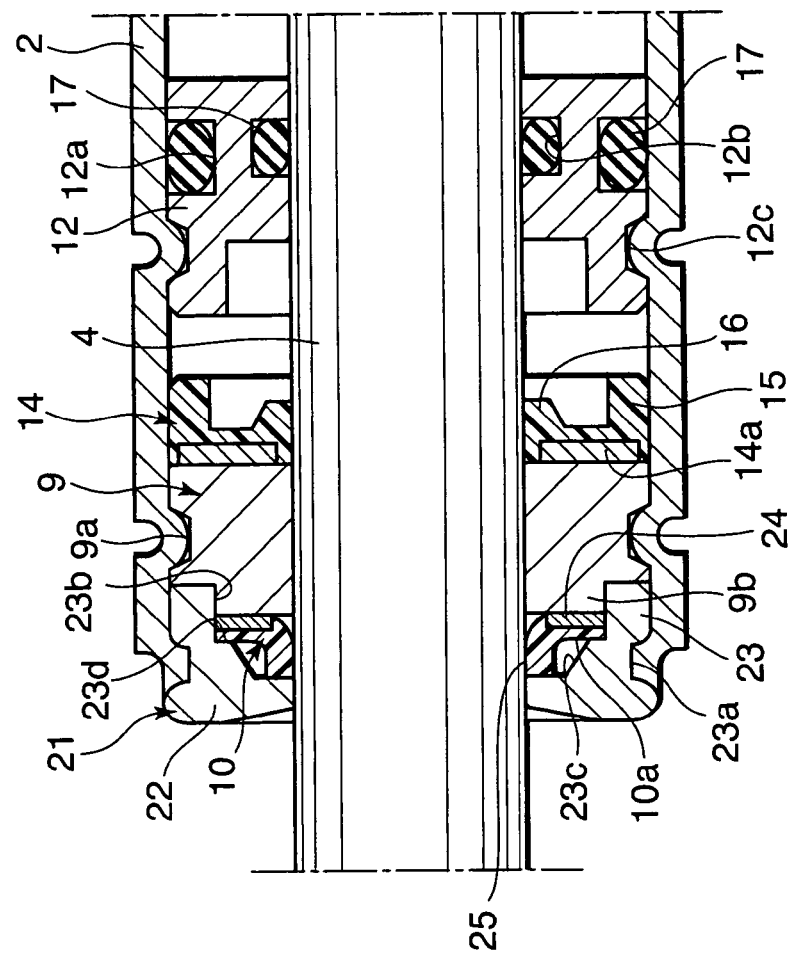

Referring to FIG. 1 of the drawings, a gas spring 1 adapted to assist the opening/closing of a vertical swing door of a vehicle comprises a cylinder 2, a piston 3 enclosed in the cylinder 2, and a piston rod 4 connected to the piston 3 and projecting outward axially from the cylinder 2.

The cylinder 2 is filled with a pressurized gas which pushes resiliently the piston rod 4 via the piston 3 such that the piston rod 4 projects outward. Pressurized gas in chambers 30A and 30B delimited by the piston 3 in the cylinder 2 communicates via a through hole 31 which penetrates the piston 3 and exerts a force on the piston 3 in the elongation direction of the piston rod 4 due to a difference in the pressure receiving areas of the piston 3 in the chamber 30A and the chamber 30B.

The piston rod 4 penetrates a bearing 9 fixed to an open end of the cylinder 2 to project outward from the cylinder 2. It also penetrates a retainer 12 fixed in the cylinder 2 between the bearing 9 and the piston 3. The retainer 12 limits elongation of the piston rod 4 beyond a predetermined length, by coming into contact with the piston 3. The bearing 9 functions to support the piston rod 4 so that the piston rod 4 does not move laterally when it elongates and contracts.

The retainer 12 has a fitting groove 12c on its outer circumference and the bearing 9 has a fitting groove 9a on its outer circumference. The retainer 12 and the bearing 9 are first inserted into the cylinder 2 and then fixed respectively in predetermined positions in the cylinder 2 by caulking the cylinder 2 into the fitting grooves 12c and 9a respectively.

A seal groove 12a is formed on the outer circumference of the retainer 12 and a seal groove 12b is formed on the inner circumference thereof. An O-ring 17 is fitted into the seal grooves 12a, 12b, respectively. The retainer 12 is in close contact with the inner circumference of the cylinder 2 and the outer circumference of the piston rod 4 via the O-rings 17 so as to prevent gas leakage into the chambers 30A, 30B.

Lubricating oil is stored in a space between the retainer 12 and the bearing 9 in the cylinder 2.

A seal member 14 is fitted to an end face of the bearing 9 facing the retainer 12 in order to prevent the lubricating oil from leaking. The seal member 14 is made of an elastic material such as rubber and is fixed to the bearing 9 via a washer 14a made of a flat ring-shaped plate. The seal member 14 comprises an outer lip 15 which is in contact with the inner circumference of the cylinder 2 and an inner lip 16 which is in contact with the outer circumference of the piston rod 4.

A dust seal 10 is fitted to the other end face of the bearing 9, which is far from retainer 12 and faces outward, to prevent dust from invading the cylinder 2 as the piston rod 4 slides. The dust seal 10 is made of an elastic material such as rubber and fitted onto the bearing 9 via a washer 24 made of a flat ring-shaped plate. The end face of the bearing 9 facing outward onto which the dust seal 10 is fitted is located on a small diameter part 9b which has a smaller diameter than the other part of the bearing 9. The dust seal 10 comprises an annular base portion 10a and a dust lip 25 that extends from the inner circumference of the base portion 10a and is always in contact with the outer circumference of the piston rod 4.

The gas spring 1 further comprises a cap shaped seal protecting member 21 which protects the dust seal 10. The seal protecting member 21 comprises an engaging portion 23 formed into a cylindrical shape and inserted in an annular space formed between the small diameter part 9b of the bearing 9 and the inner circumference of the cylinder 2, and a shield portion 22 which extends inward from the tip of the engaging portion 23 towards the piston rod 4.

A fitting groove 23a is formed on the outer circumference of the engaging portion 23. The seal protecting member 21 is fixed to the cylinder 2 by inserting the engaging portion 23 into the annular space between the small diameter part 9b of the bearing 9 and the inner circumference of the cylinder 2, and caulking the cylinder 2 into the fitting groove 23a.

The shield portion 22 inclines towards the dust seal 10 as it approaches the piston rod 4 and covers the dust seal 10. The tip of the shield portion 22 is located close to the piston rod 24 such that only a minute gap is formed between the shield portion 22 and the prison rod 4.

As wall surfaces to delimit a space inside the seal protecting member 21, the seal protecting member 21 comprises a large diameter part 23b the inner circumference of which has a substantially identical diameter to the outer diameter of the small diameter part 9b of the bearing 9, an annular shape step 23d formed on the tip of the large diameter part 23b to reduce the diameter of the space in a stepwise fashion, and a tapered part 23c gradually reducing the diameter of the space from the inner end of the ring shaped step 23d towards a rear face of the shield portion 22.

The base portion 10a of the dust seal 10 is gripped together with the washer 24 between the annular step 23d of the seal protecting member 21 and the end face of the small diameter part 9b of the bearing 9. The dust lip 25 of the dust seal 10 is accommodated in the space formed by the tapered part 23c and the rear face of the shield portion 22. The dust seal 10 is thus covered entirely by the seal protecting member 21 so as not to be exposed to the outside of the cylinder 2.

The inner diameter of the large diameter part 23b of the seal protecting member 21 and the outer diameter of the base portion 10a of the dust seal 10 are preferably determined such that the outer circumference of the base portion 10a is elastically fitted into the inner circumference of the large diameter part 23b. This setting facilitates positioning of the dust seal 10 in the radial direction.

Figure 2:
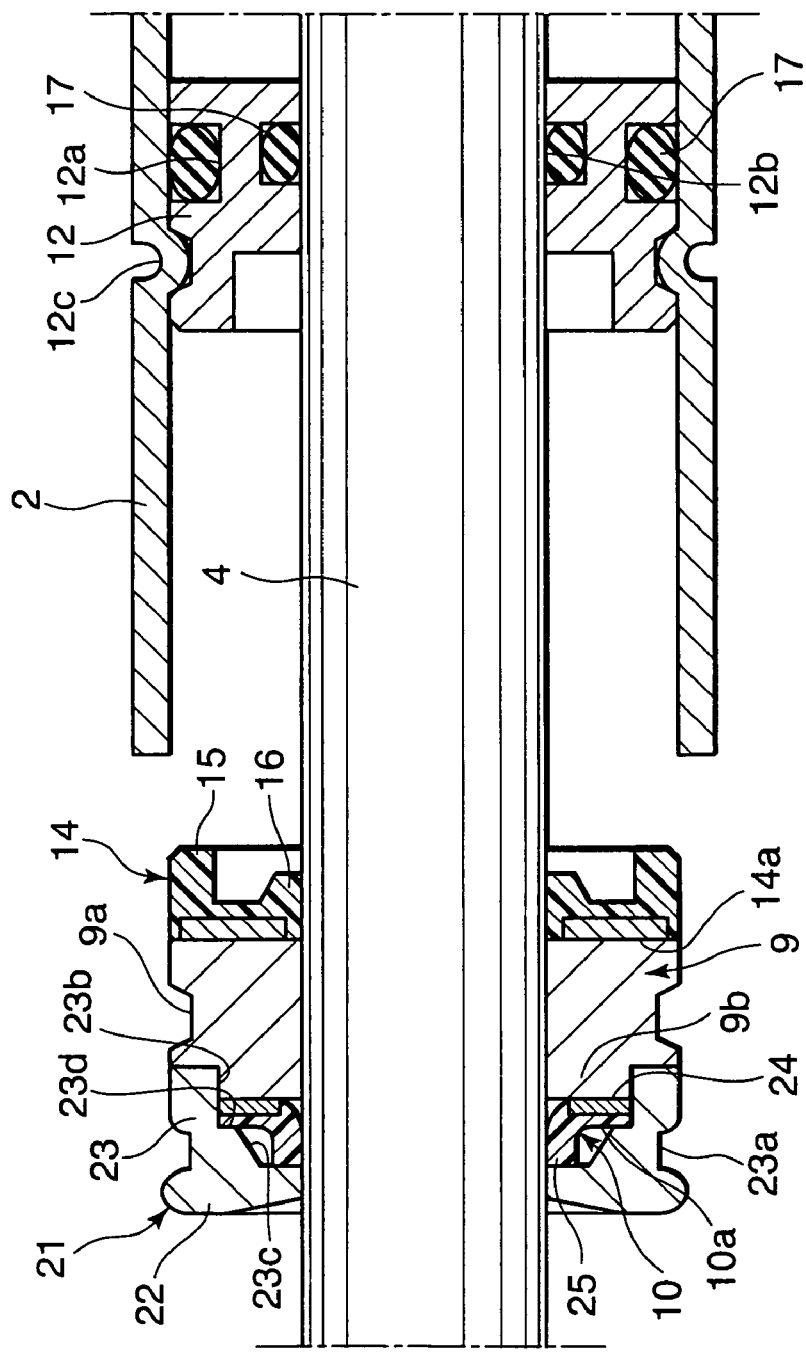
FIG. 2 is a longitudinal sectional view of essential parts of the gas spring, illustrating an exploded state thereof.

Next, referring to FIG. 2, assembly process of the gas spring 1 will be described.

First, the piston rod 4 to which the piston 3 has been fixed is inserted into the cylinder 2 from the open end. The retainer 12, including the O-rings 17, is then inserted into the cylinder 2 while letting the piston rod 4 pass through the retainer 12, and the cylinder 2 is caulked into the fitting groove 12c of the retainer 12 to fix the retainer 12 in a predetermined position in the cylinder 2.

The seal member 14 and the dust seal 10 are fitted to the bearing 9 and thereafter the seal protecting member 21 is fitted to the bearing 9 as shown in the figure. As described heretofore, if the large diameter part 23b of the seal protecting member 21 is constructed to have a function to elastically retain the outer circumference of the dust seal 10, the seal protecting member 21 can be fitted to the bearing 9 while retaining the dust seal 10 inside.

The piston rod 4 is then caused to penetrate the bearing 9 to which the seal member 14, the dust seal 10 and the seal protecting member 21 are fitted, as shown in the figure. Next, the bearing 9 is inserted into the cylinder 2, and when it reaches the predetermined position, the cylinder 2 is caulked into the fitting groove 9a to fix the bearing 9 on the inner circumference of the cylinder 2. Further, the cylinder 2 is caulked into the fitting groove 23a to fix the sealing member 21 to the open end of the cylinder 2.

In the gas spring 1 constructed as described above, since the dust seal 10 is covered by the seal protecting member 21 fixed to the end of the cylinder 2, the dust seal 10 is not exposed to ambient air, and hence deterioration of the dust seal 10 due to the operation condition of the gas spring 1 is unlikely to occur. Further, the seal protecting member 21 prevents foreign matter from coming into contact with the dust seal 10, and hence the dust seal 10 is also unlikely to be damaged by foreign matter.

The seal protecting member 21 according to this invention is arranged to be fitted to the bearing 9 in advance when installed into the cylinder 2. Installation of the seal protecting member 21 into the cylinder 2 is therefore performed without increasing the man-hour required for assembling the gas spring 1. In other words, by fitting the engaging portion 23 of the seal protecting member 21 onto the small diameter part 9b of the bearing 9, the dust seal 10 is fitted onto the bearing 9. In other words, the seal protecting member 21 and the dust seal 10 can be fitted onto the bearing 9 together in one operation. This invention can therefore be implemented without increasing the assembling complexity of the gas spring 1.

The seal protecting member 21 is fixed in the cylinder 2 by caulking as in the cases of the retainer 12 and the bearing 9. Fixing the seal protecting member 21 can therefore be performed using the same device used for fixing the retainer 12 and the bearing 9 in the cylinder 2.

As a result, increases in the manufacturing cost of the gas spring 1 for implementing this invention are suppressed.

Figure 3:
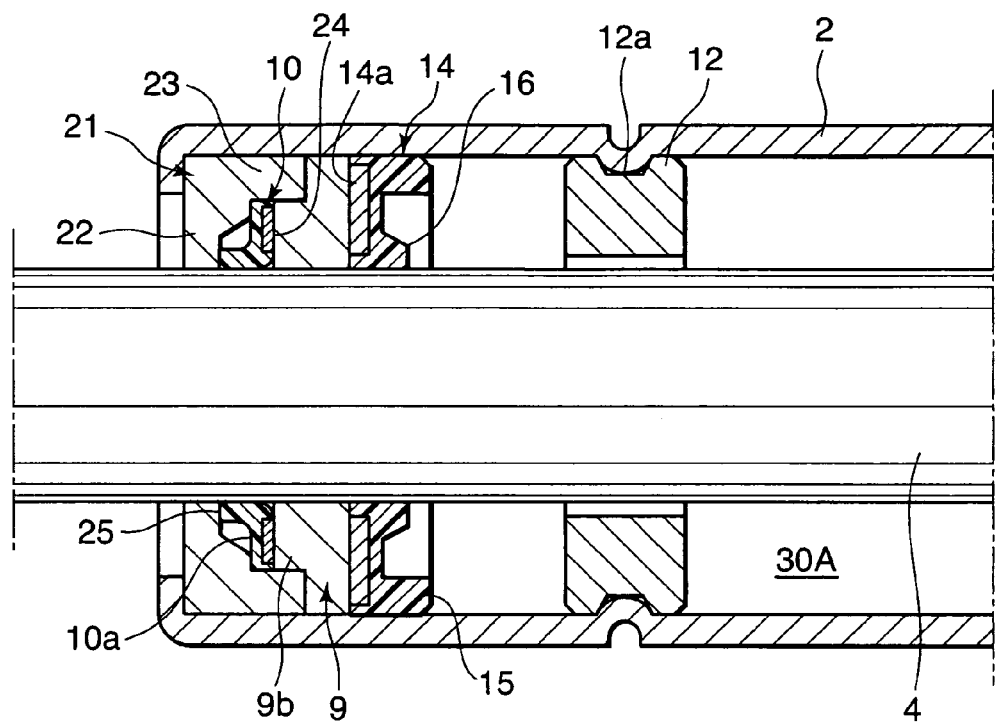
FIG. 3 is similar to FIG. 1 but shows a second embodiment of this invention.

Next, referring to FIG. 3, a second embodiment of this invention will be described.

In this embodiment, the seal protecting member 21 is fixed to the open end of the cylinder 2 to prevent it from dropping out of the cylinder 2 by bending the open end of the cylinder 2 inward instead of caulking the cylinder 2. According to this embodiment, the fitting groove 23a formed on the outer circumference of the seal protecting member 21 can be omitted.

It is also possible to fix the bearing 9 in the cylinder 2 by press fitting instead of caulking the cylinder 2. In this case, the fitting groove 9a on the outer circumference of the bearing 9 can also be omitted.

Figure 4:
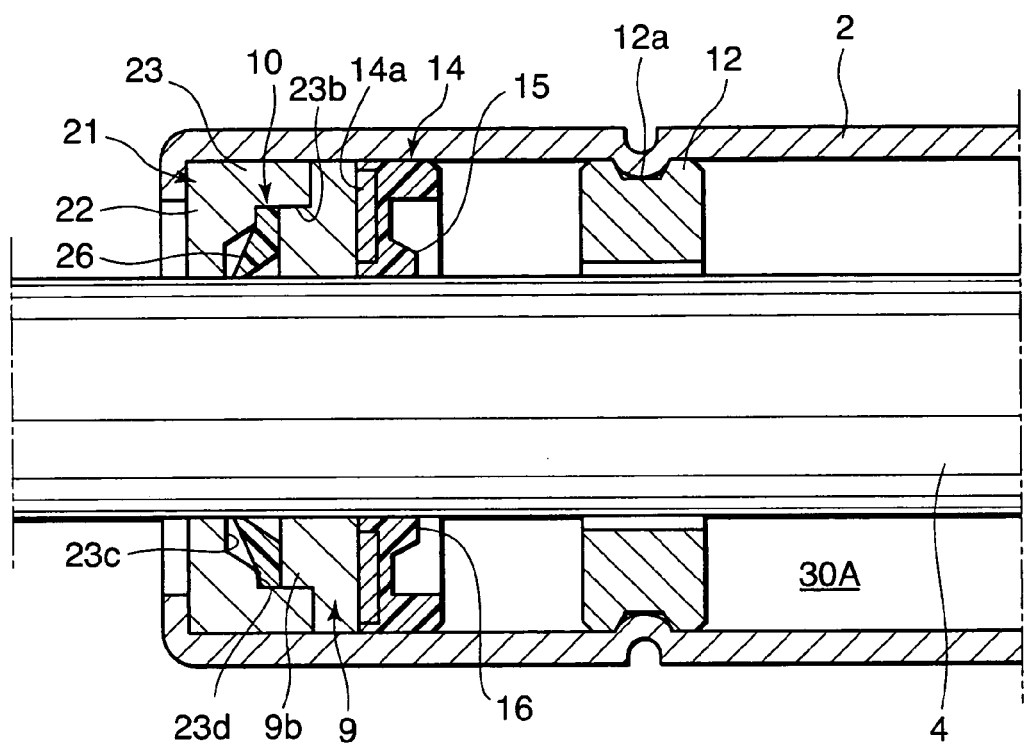
FIG. 4 is similar to FIG. 1 but shows a third embodiment of this invention.

Next, referring to FIG. 4, a third embodiment of this invention will be described.

According to this embodiment, the dust seal 10 is provided with a scraper 26 instead of the dust lip 25. The other components of the gas spring 1 are identical to those of the second embodiment. As can be understood from this embodiment, this invention can be implemented irrespective of the construction and configuration of the dust seal 10.

With respect to the above description, the contents of Tokugan 2006-033493, with a filing date of Feb. 10, 2006 in Japan, are hereby incorporated by reference.

Although the invention has been described above with reference to certain embodiments of the invention, the invention is not limited to the embodiments described above. Modifications and variations of the embodiments described above will occur to those skilled in the art, within the scope of the claims.

For example, in the embodiments described above, the inner circumference of the large diameter part 23b of the seal protecting member 21 elastically retains the outer circumference of the dust seal 10, but it is also possible to provide a clearance between the outer circumference of the dust seal 10 and the inner circumference of the large diameter part 23b. If this modification is applied, a slight displacement of the dust seal 10 in the radial direction will be allowed. As a result, when a load acts on the piston rod 4 in a radial direction and the piston rod 4 slightly displaces radially when the gas spring 1 operates, the dust seal 10 can also displace radially in accordance with the radial displacement of the piston rod 4. This modification is therefore preferable in view of the dust sealing performance of the dust seal 10 relative to a radial load acting on the piston rod 4.

The embodiments of this invention in which an exclusive property or privilege is claimed are defined as follows:

What is claimed is:

1. A gas spring comprising:
   a cylinder having an open end and being filled with a gas;
   a piston rod projecting outward from the open end of the cylinder in accordance with a pressure of the gas, which performs elongation/contraction depending on an axial load exerted thereon;
   a dust seal disposed in the cylinder in contact with the piston rod to prevent dust from entering the cylinder through the open end thereof;
   a seal protecting member which shields the dust seal from exposure to the outside of the cylinder, and having an engaging portion having a cylindrical shape, and a shield portion extending inward from a tip of the engaging portion towards the piston rod; and
   a bearing which is fixed to the open end of the cylinder to allow the piston rod to slide therethrough, and retains the dust seal and the protecting member thereon, said bearing comprising a small diameter part forming an annular space between an inner circumference of the cylinder and the bearing, the engaging portion of said seal protecting member being fitted on an outer circumference of the small diameter part.

2. The gas spring as defined in claim 1, wherein the seal protecting member further comprises wall surfaces forming a space which accommodates the dust seal between the seal protecting member and the bearing.

3. The gas spring as defined in claim 2, wherein the wall surfaces comprise an annular step disposed perpendicular to the piston rod, and the dust seal comprises an annular base portion which is gripped by an end face of the small diameter part and the annular step.

4. The gas spring as defined in claim 3, wherein the dust seal further comprises a dust lip extending from an inner circumference of the annular base portion in contact with the piston rod.

5. The gas spring as defined in claim 3, wherein the dust seal further comprises a scraper extending from an inner circumference of the annular shape base portion and comprising a tip which is in contact with the piston rod.

6. The gas spring as defined in claim 3, wherein the wall surfaces further comprise a large diameter part formed into a cylindrical shape, which is fitted on the outer circumference of the small diameter part and elastically retains the dust seal therein.

7. The gas spring as defined in claim 3, wherein the wall surfaces further comprise a large diameter part formed into a cylindrical shape, which is fitted on the outer circumference of the small diameter part and accommodates the dust seal therein such that the dust seal is capable of displacement in a radial direction.

8. The gas spring as defined in claim 1, wherein the seal protecting member is fixed to the open end of the cylinder by caulking the cylinder into a fitting groove formed on an outer circumference of the engaging portion.

9. The gas spring as defined in claim 1, wherein the seal protecting member is gripped between the inwardly bent open end of the cylinder and the bearing.

10. The gas spring as defined in claim 1, further comprising a piston connected to the piston rod and enclosed in the cylinder, a pair of chambers formed by the piston in the cylinder and filled with the gas, and a retainer fixed in the cylinder so as to prevent elongation of the piston rod beyond a predetermined length.

* * * * *